April 29, 1969     O. C. KINDORF     3,441,240
ONE-PIECE PIPE STRAP WITH THREADED ADJUSTING MEANS
Filed March 10, 1967
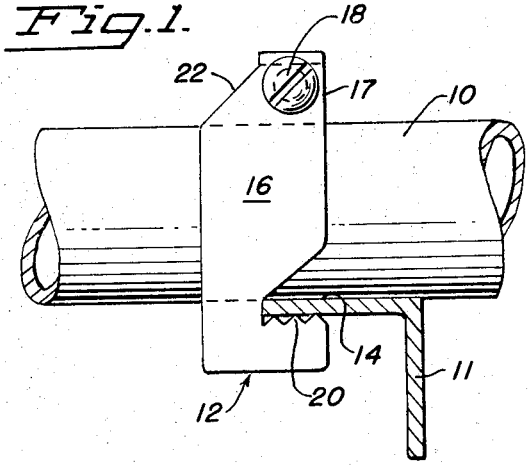
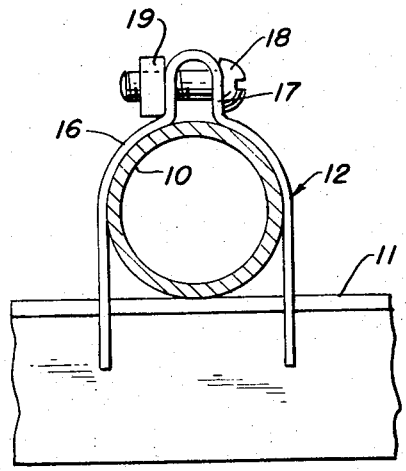
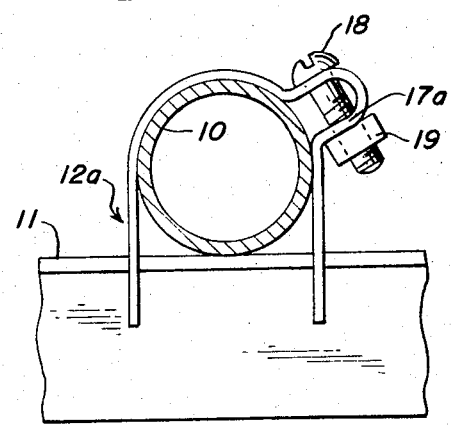
INVENTOR
ORLAN C. KINDORF
BY
ATTORNEYS

United States Patent Office 3,441,240
Patented Apr. 29, 1969

3,441,240
ONE-PIECE PIPE STRAP WITH THREADED
ADJUSTING MEANS
Orlan C. Kindorf, 4024 Tilden Lane,
Lafayette, Calif. 94549
Filed Mar. 10, 1967, Ser. No. 622,175
Int. Cl. F16l 3/24
U.S. Cl. 248—72          3 Claims

ABSTRACT OF THE DISCLOSURE

A one-piece U-shaped pipe strap with notches near the legs of the U to embrace the edge of a pipe support while the strap embraces the pipe and a small U-bend in the strap with adjusting means subtending the small U to tighten the main U-shaped strap about the pipe.

---

A pipe strap of U-shape which embraces a pipe and holds it against a support is disclosed in my United States Patent No. 3,181,826 for "Friction Pipe Strap" which issued May 4, 1965. The strap of said patent has among other advantages low-cost, easy application and simple construction of a single piece of metal. It is, however, limited in its application because it is held in place by friction and does not accommodate variations from nominal dimensions of the pipe or bracket to which it is secured.

It is the object of the present invention to provide a pipe strap which overcomes the shortcomings of the strap disclosed in the patent referred to and to provide a strap which, for all practical purposes, is a one piece strap but includes a tightening device completely installed and ready for use as the strap is applied so that a workman on a ladder or in other awkward circumstances can easily install the strap with one hand.

Further and more specific objects and advantages of my invention are made apparent in the following specification wherein reference is made to the accompanying drawing.

In the drawing:

FIG. 1 is a view in side elevation of a pipe strap embodying the present invention showing it in place securing a pipe to an angular shaped bracket or support;

FIG. 2 is a view in end elevation of the pipe strap of FIG. 1 with a pipe illustrated in section; and FIG. 3 is a view like FIG. 2 showing a modification of the invention.

A pipe 10 is shown as supported by a bracket 11 and is secured by a strap indicated at 12 constructed in accordance with the present invention. The strap 12 is of generally U-shaped configuration, a curved portion which connects the legs of the U being of a size to substantially closely conform to the curvature of the pipe. Adjacent the lower ends of the legs are notches 14, one being shown in FIG. 1 embracing an edge of the support which in the case illustrated is the flange of an angle beam. One edge of the notch which engages with the support is provided with barbs or teeth shown as 3 in number to inhibit slipping of the strap with respect to the support. Barbs or teeth may not necessarily always be required.

Because of slight variations in size of pipes having the same nominal size and in the thickness of flanges or supports against which the pipes might rest, it is desirable to have means for adjusting or decreasing the size of the U-shaped strap-like hanger after it has been put in place in order that it will firmly embrace the pipe and supporting member. Generally speaking, strap-type hangers and other devices which employ an adjusting member are formed in two pieces and the two pieces are drawn together by a nut and bolt or the like. A two-piece pipe hanger used in the manner of the hanger of the present invention has disadvantages, particularly in applying it to the pipe and support which must often be done with one hand. Even though a hanger is made in two parts, loosely connected by a nut and bolt to be tightened after it is in position, the parts tend to swing or dangle on the bolt and are relatively unmanageable as they are being positioned with respect to the pipe and support. The present invention avoids the disadvantage by providing what is in effect a one-piece hanger which includes a tightening device made of separate pieces but so assembled with the hanger that the principal piece is a single integral unit always disposed for ready application to the pipe and support.

As shown in FIGS. 1 and 2, the main arcuate portion 16 of the hanger which embraces the pipe is interrupted by a small U-shaped bend 17. The legs of this small bend are perforated for reception of a threaded tightening device here shown as a bolt 18 and a nut 19. The tightening device is loosely assembled through the legs of the small U in readiness for the application of a screw driver when the clamp has been applied to the pipe and support. The nut is, as shown, of a size and so spaced that one of its edges registers with the bend at the juncture of one side of the arcuate portion 16 and one leg of the small U-bend. This prevents rotation of the nut so that a screw driver held in one hand is all that is necessary to rotate the bolt 18 to draw the legs of the small U toward each other and consequently tighten the clamp about the pipe as well as draw it into firm contact with the supporting member. As may be observed in FIG. 1, the notch 14 may be provided with barbs or teeth, a central one of which is shown at 20 and the apex of this central tooth and the center of the bolt 18 are in direct alignment in a plane normal to the axis of the pipe. Consequently tightening of the bolt 18 tends to draw the teeth engaging the support 11 directly toward the bolt and cocking of the clamp is avoided. Since the bolt is off center with respect to the width of the clamp, the leg portions of the U 17 may be cut away as shown at 22 in FIG. 1. This makes the curved portion of the small U somewhat more flexible and more easily bent as tightening takes place.

The invention is disclosed herein as clamping a pipe in a horizontal position to a horizontally disposed bracket or support of angular cross section. It is to be understood that various other dispositions of the pipe and supporting member are possible and the configuration of the supporting member may also vary considerably. One commonly used supporting member for example is a channel-shaped member with the ends of the legs turned inwardly and the clamp is useable with such a member either with or without the barbs in the notch 14. It is also of course to be understood that the term "pipe" as used herein includes all types of conduits, cables and other members capable of being supported in this manner.

A modified form of the invention is illustrated in FIG. 3 wherein the small U-bend 17 of FIG. 2 is illustrated at 17a as being disposed at an angle to a plane which is normal to and intersected by the axis of the pipe. In this view, the pipe is shown at 10 and the clamp is shown at 12a. With the small U and tightening device so disposed, they do not project as far away from the pipe as they do in the modification of FIG. 2 so that some space is saved and there is less likelihood of persons in the vicinity catching their clothes or being injured by contact with the tightening device. Another very important advantage derived from this angular position of the tightening device results when several pipes are secured to the same support closely adjacent each other. With the modification of FIG. 3, a screw driver can readily be applied to the bolt 18 without interfering with tightening devices on adjacent parallel pipes.

I claim:

1. In a pipe strap comprising a member of U-shape having legs with notches to embrace a support against which a pipe rests while the pipe is embraced by and in contact with the curved portion of the U, the improvement which comprises a bend in the strap defining a small U extending outwardly from the main U, and a tightening device for urging the legs of the small U toward each other to effectively shorten the legs of the main U, in which the tightening device is a nut and bolt subtending the small U with the nut held against rotation by a bend in the strap between the main U and the small U, a portion of the curved part of the small U being reduced in width to facilitate its being deformed by the tightening device, and barbs on edges of the notches which engage the support.

2. The combination of claim 1 in which the barbed edges occur adjacent one side of the strap which forms the legs and the tightening device is disposed toward the same side.

3. The combination of claim 2 in which the tightening device and the central portions of the barbed edges are in a common plain normal to and intersecting the axis of the pipe.

References Cited

UNITED STATES PATENTS

| | | | |
|---|---|---|---|
| 2,042,263 | 5/1936 | La Valley | 24—279 |
| 2,102,900 | 12/1937 | Konkel | 248—74 |
| 3,087,221 | 4/1963 | Armstrong | 24—279 |
| 3,126,182 | 3/1964 | Stamper | 248—72 |

FOREIGN PATENTS 178,697   3/1962   Sweden.

CHANCELLOR E. HARRIS, *Primary Examiner.*